(12) United States Patent  (10) Patent No.: US 8,922,890 B2
Bangerter et al. (45) Date of Patent: Dec. 30, 2014

(54) POLARIZER EDGE RIB MODIFICATION

(75) Inventors: Vern Bangerter, Salem, UT (US);
Mitchell R. Larsen, Orem, UT (US)

(73) Assignee: Moxtek, Inc., Orem, UT (US)

( * ) Notice: Subject to any disclaimer, the term of this patent is extended or adjusted under 35 U.S.C. 154(b) by 433 days.

(21) Appl. No.: 13/425,865

(22) Filed: Mar. 21, 2012

(65) Prior Publication Data

US 2013/0250411 A1 Sep. 26, 2013

(51) Int. Cl.
*G02B 5/30* (2006.01)

(52) U.S. Cl.
CPC .............. *G02B 5/30* (2013.01); *G02B 5/3058* (2013.01)
USPC ................. 359/485.05; 359/487.03

(58) Field of Classification Search
CPC ............... G02B 5/3058; G02F 2001/133548
USPC ...................... 359/485.05, 487.03
See application file for complete search history.

(56) References Cited

U.S. PATENT DOCUMENTS

| | | | |
|---|---|---|---|
| 2,224,214 A | 12/1940 | Brown |
| 2,237,567 A | 4/1941 | Land |
| 2,287,598 A | 6/1942 | Brown |
| 2,391,451 A | 12/1945 | Fischer |
| 2,403,731 A | 7/1946 | MacNeille |
| 2,605,352 A | 7/1952 | Fishcer |
| 2,748,659 A | 6/1956 | Geffcken et al. |
| 2,813,146 A | 11/1957 | Glenn |
| 2,815,452 A | 12/1957 | Mertz |
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |

(Continued)

FOREIGN PATENT DOCUMENTS

AU 2003267964 12/2003
CH 0296391 2/1954

(Continued)

OTHER PUBLICATIONS

U.S. Appl. No. 13/224,719, filed Sep. 2, 2011, Mark Alan Davis; office action dated Mar. 29, 2013.

(Continued)

*Primary Examiner* — Frank Font

(74) *Attorney, Agent, or Firm* — Thorpe North & Western LLP

(57) ABSTRACT

A polarizer having a first surface bordered by an edge, including a standard region and a rib modification region. The standard region can include ribs having a standard characteristic. The standard region can be configured to polarize incident light. The rib modification region can be disposed along at least a segment of the edge of the substrate between the edge and at least a portion of the standard region. The rib modification region can comprise modified ribs modified from the standard characteristic to have a different characteristic.

16 Claims, 8 Drawing Sheets

(56) References Cited

U.S. PATENT DOCUMENTS

| | | |
|---|---|---|
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck et al. |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman, Jr. et al. |
| 5,748,368 A * | 5/1998 | Tamada et al. ........... 359/485.03 |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |

(56) References Cited

U.S. PATENT DOCUMENTS

| | | | |
|---|---|---|---|
| 5,828,489 | A | 10/1998 | Johnson et al. |
| 5,833,360 | A | 11/1998 | Knox et al. |
| 5,838,403 | A | 11/1998 | Jannson et al. |
| 5,841,494 | A | 11/1998 | Hall |
| 5,844,722 | A | 12/1998 | Stephens et al. |
| 5,864,427 | A | 1/1999 | Fukano et al. |
| 5,872,653 | A | 2/1999 | Schrenk et al. |
| 5,886,754 | A | 3/1999 | Kuo |
| 5,890,095 | A | 3/1999 | Barbour et al. |
| 5,898,521 | A | 4/1999 | Okada |
| 5,899,551 | A | 5/1999 | Neijzen et al. |
| 5,900,976 | A | 5/1999 | Handschy et al. |
| 5,907,427 | A | 5/1999 | Scalora et al. |
| 5,912,762 | A | 6/1999 | Li et al. |
| 5,914,818 | A | 6/1999 | Tejada et al. |
| 5,917,562 | A | 6/1999 | Woodgate et al. |
| 5,918,961 | A | 7/1999 | Ueda |
| 5,930,050 | A | 7/1999 | Dewald |
| 5,943,171 | A | 8/1999 | Budd et al. |
| 5,958,345 | A | 9/1999 | Turner et al. |
| 5,965,247 | A | 10/1999 | Jonza et al. |
| 5,969,861 | A | 10/1999 | Ueda et al. |
| 5,973,833 | A | 10/1999 | Booth et al. |
| 5,978,056 | A | 11/1999 | Shintani et al. |
| 5,982,541 | A | 11/1999 | Li et al. |
| 5,986,730 | A | 11/1999 | Hansen et al. |
| 5,991,075 | A | 11/1999 | Katsuragawa et al. |
| 5,991,077 | A | 11/1999 | Carlson et al. |
| 6,005,918 | A | 12/1999 | Harris et al. |
| 6,008,871 | A | 12/1999 | Okumura |
| 6,008,951 | A | 12/1999 | Anderson |
| 6,010,121 | A | 1/2000 | Lee |
| 6,016,173 | A | 1/2000 | Crandall |
| 6,018,841 | A | 2/2000 | Kelsay et al. |
| 6,049,428 | A | 4/2000 | Khan et al. |
| 6,053,616 | A | 4/2000 | Fujimori et al. |
| 6,055,103 | A | 4/2000 | Woodgate et al. |
| 6,056,407 | A | 5/2000 | Iinuma et al. |
| 6,062,694 | A | 5/2000 | Oikawa et al. |
| 6,075,235 | A | 6/2000 | Chun |
| 6,081,312 | A | 6/2000 | Aminaka et al. |
| 6,081,376 | A | 6/2000 | Hansen et al. |
| 6,082,861 | A | 7/2000 | Dove et al. |
| 6,089,717 | A | 7/2000 | Iwai |
| 6,096,155 | A | 8/2000 | Harden et al. |
| 6,096,375 | A | 8/2000 | Ouderkirk et al. |
| 6,100,928 | A | 8/2000 | Hata |
| 6,108,131 | A | 8/2000 | Hansen et al. |
| 6,122,103 | A | 9/2000 | Perkins et al. |
| 6,122,403 | A | 9/2000 | Rhoads |
| 6,124,971 | A | 9/2000 | Ouderkirk et al. |
| 6,141,075 | A | 10/2000 | Kumuro et al. |
| 6,147,728 | A | 11/2000 | Okumura et al. |
| 6,172,813 | B1 | 1/2001 | Tadic-Galeb et al. |
| 6,172,816 | B1 | 1/2001 | Tadic-Galeb et al. |
| 6,181,386 | B1 | 1/2001 | Knox |
| 6,181,458 | B1 | 1/2001 | Brazas, Jr. et al. |
| 6,185,041 | B1 | 2/2001 | TadicGaleb et al. |
| 6,208,463 | B1 | 3/2001 | Hansen et al. |
| 6,215,547 | B1 | 4/2001 | Ramanujan et al. |
| 6,234,634 | B1 | 5/2001 | Hansen et al. |
| 6,243,199 | B1 | 6/2001 | Hansen et al. |
| 6,247,816 | B1 | 6/2001 | Cipolla et al. |
| 6,249,378 | B1 | 6/2001 | Shimamura et al. |
| 6,250,762 | B1 | 6/2001 | Kuijper |
| 6,251,297 | B1 | 6/2001 | Komuro et al. |
| 6,282,025 | B1 | 8/2001 | Huang et al. |
| 6,288,840 | B1 | 9/2001 | Perkins et al. |
| 6,291,797 | B1 | 9/2001 | Koyama et al. |
| 6,310,345 | B1 | 10/2001 | Pittman et al. |
| 6,339,454 | B1 | 1/2002 | Knox |
| 6,340,230 | B1 | 1/2002 | Bryars et al. |
| 6,345,895 | B1 | 2/2002 | Maki et al. |
| 6,348,995 | B1 | 2/2002 | Hansen et al. |
| 6,375,330 | B1 | 4/2002 | Mihalakis |
| 6,390,626 | B2 | 5/2002 | Knox |
| 6,398,364 | B1 | 6/2002 | Bryars |
| 6,406,151 | B1 | 6/2002 | Fujimori |
| 6,409,525 | B1 | 6/2002 | Hoelscher et al. |
| 6,411,749 | B2 | 6/2002 | Teng et al. |
| 6,424,436 | B1 | 7/2002 | Yamanaka |
| 6,426,837 | B1 | 7/2002 | Clark et al. |
| 6,447,120 | B1 | 9/2002 | Hansen et al. |
| 6,452,724 | B1 | 9/2002 | Hansen et al. |
| 6,460,998 | B1 | 10/2002 | Watanabe |
| 6,473,236 | B2 | 10/2002 | Tadic-Galeb et al. |
| 6,486,997 | B1 | 11/2002 | Bruzzone et al. |
| 6,490,017 | B1 | 12/2002 | Huang et al. |
| 6,496,239 | B2 | 12/2002 | Seiberle |
| 6,496,287 | B1 | 12/2002 | Seiberle et al. |
| 6,511,183 | B2 | 1/2003 | Shimizu et al. |
| 6,514,674 | B1 | 2/2003 | Iwasaki |
| 6,520,645 | B2 | 2/2003 | Yamamoto et al. |
| 6,532,111 | B2 | 3/2003 | Kurtz et al. |
| 6,547,396 | B1 | 4/2003 | Svardal et al. |
| 6,580,471 | B2 | 6/2003 | Knox |
| 6,583,930 | B1 | 6/2003 | Schrenk et al. |
| 6,585,378 | B2 | 7/2003 | Kurtz et al. |
| 6,624,936 | B2 | 9/2003 | Kotchick et al. |
| 6,643,077 | B2 | 11/2003 | Magarill et al. |
| 6,654,168 | B1 | 11/2003 | Borrelli |
| 6,661,475 | B1 | 12/2003 | Stahl et al. |
| 6,661,484 | B1 | 12/2003 | Iwai et al. |
| 6,665,119 | B1 | 12/2003 | Kurtz |
| 6,666,556 | B2 | 12/2003 | Hansen et al. |
| 6,669,343 | B2 | 12/2003 | Shahzad et al. |
| 6,698,891 | B2 | 3/2004 | Kato |
| 6,704,469 | B1 | 3/2004 | Xie et al. |
| 6,710,921 | B2 | 3/2004 | Hansen et al. |
| 6,714,350 | B2 | 3/2004 | Silverstein et al. |
| 6,721,096 | B2 | 4/2004 | Bruzzone et al. |
| 6,739,723 | B1 | 5/2004 | Haven et al. |
| 6,746,122 | B2 | 6/2004 | Knox |
| 6,764,181 | B2 | 7/2004 | Magarill et al. |
| 6,769,779 | B1 | 8/2004 | Ehrne et al. |
| 6,781,640 | B1 | 8/2004 | Huang |
| 6,785,050 | B2 | 8/2004 | Lines et al. |
| 6,788,461 | B2 | 9/2004 | Kurtz et al. |
| 6,805,445 | B2 | 10/2004 | Silverstein et al. |
| 6,809,864 | B2 | 10/2004 | Martynov et al. |
| 6,809,873 | B2 | 10/2004 | Cobb |
| 6,811,274 | B2 | 11/2004 | Olczak |
| 6,813,077 | B2 | 11/2004 | Borrelli et al. |
| 6,816,290 | B2 | 11/2004 | Mukawa |
| 6,821,135 | B1 | 11/2004 | Martin |
| 6,823,093 | B2 | 11/2004 | Chang et al. |
| 6,829,090 | B2 | 12/2004 | Katsumata et al. |
| 6,844,971 | B2 | 1/2005 | Silverstein et al. |
| 6,846,089 | B2 | 1/2005 | Stevenson et al. |
| 6,859,303 | B2 | 2/2005 | Wang et al. |
| 6,876,784 | B2 | 4/2005 | Nikolov et al. |
| 6,896,371 | B2 | 5/2005 | Shimizu et al. |
| 6,897,926 | B2 | 5/2005 | Mi et al. |
| 6,899,440 | B2 | 5/2005 | Bierhuizen |
| 6,900,866 | B2 | 5/2005 | Kurtz et al. |
| 6,909,473 | B2 | 6/2005 | Mi et al. |
| 6,920,272 | B2 | 7/2005 | Wang |
| 6,922,287 | B2 | 7/2005 | Wiki et al. |
| 6,926,410 | B2 | 8/2005 | Weber et al. |
| 6,927,915 | B2 | 8/2005 | Nakai |
| 6,934,082 | B2 | 8/2005 | Allen et al. |
| 6,943,941 | B2 | 9/2005 | Flagello et al. |
| 6,947,215 | B2 | 9/2005 | Hoshi |
| 6,954,245 | B2 | 10/2005 | Mi et al. |
| 6,972,906 | B2 | 12/2005 | Hasman et al. |
| 6,976,759 | B2 | 12/2005 | Magarill et al. |
| 6,981,771 | B1 | 1/2006 | Arai et al. |
| 7,009,768 | B2 | 3/2006 | Sakamoto |
| 7,013,064 | B2 | 3/2006 | Wang |
| 7,023,512 | B2 | 4/2006 | Kurtz et al. |
| 7,023,602 | B2 | 4/2006 | Aastuen et al. |
| 7,025,464 | B2 | 4/2006 | Beeson et al. |
| 7,026,046 | B2 | 4/2006 | Edlinger et al. |
| 7,046,422 | B2 | 5/2006 | Kimura et al. |

(56) References Cited

U.S. PATENT DOCUMENTS

| | | |
|---|---|---|
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,297,386 B2 | 11/2007 | Suzuki et al. |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,466,484 B2 | 12/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 * | 10/2010 | Perkins et al. ............ 359/485.05 |
| 7,944,544 B2 | 5/2011 | Amako et al. |
| 7,961,393 B2 | 6/2011 | Perkins |
| 8,009,355 B2 | 8/2011 | Nakai |
| 8,027,087 B2 | 9/2011 | Perkins et al. |
| 8,138,534 B2 | 3/2012 | Adkisson et al. |
| 8,248,697 B2 * | 8/2012 | Kenmochi ............... 359/485.05 |
| 8,493,658 B2 * | 7/2013 | Nishida et al. .......... 359/485.05 |
| 8,611,007 B2 * | 12/2013 | Davis ...................... 359/485.05 |
| 8,619,215 B2 * | 12/2013 | Kumai ............................ 349/96 |
| 8,696,131 B2 * | 4/2014 | Sawaki ............................ 353/20 |
| 2001/0006421 A1 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hanson |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 * | 6/2003 | Kane .............................. 359/513 |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2003/0227678 A1 | 12/2003 | Lines et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarley et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins et al. |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0037101 A1 | 2/2008 | Jagannathan et al. |

(56) References Cited

U.S. PATENT DOCUMENTS

| | | |
|---|---|---|
| 2008/0038467 A1 | 2/2008 | Jagannathan et al. |
| 2008/0005722 A1 | 3/2008 | Perkins |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0055723 A1 | 3/2008 | Gardner |
| 2008/0094547 A1 | 4/2008 | Sugita et al. |
| 2008/0137188 A1 | 6/2008 | Sato et al. |
| 2008/0192346 A1 | 8/2008 | Kim et al. |
| 2008/0316599 A1 | 12/2008 | Wang et al. |
| 2009/0009865 A1 | 1/2009 | Nishida et al. |
| 2009/0040607 A1 | 2/2009 | Amako et al. |
| 2009/0041971 A1 | 2/2009 | Wang et al. |
| 2009/0053655 A1 | 2/2009 | Deng et al. |
| 2009/0109377 A1 | 4/2009 | Sawaki et al. |
| 2010/0103517 A1 | 4/2010 | Davis et al. |
| 2010/0188747 A1* | 7/2010 | Amako et al. ............... 359/486 |
| 2010/0225832 A1* | 9/2010 | Kumai ............... 349/8 |
| 2010/0238555 A1 | 9/2010 | Amako et al. |
| 2010/0239828 A1 | 9/2010 | Cornaby |
| 2010/0328767 A1 | 12/2010 | Kato |
| 2010/0328768 A1 | 12/2010 | Lines |
| 2010/0328769 A1 | 12/2010 | Perkins |
| 2011/0080640 A1 | 4/2011 | Kaida et al. |
| 2011/0096396 A1 | 4/2011 | Kaida et al. |
| 2011/0115991 A1 | 5/2011 | Sawaki |
| 2011/0235181 A1 | 9/2011 | Hayashibe et al. |
| 2012/0008205 A1 | 1/2012 | Perkins et al. |
| 2012/0075699 A1 | 3/2012 | Davis |
| 2012/0206805 A1* | 8/2012 | Meng et al. ............... 359/487.03 |
| 2012/0250154 A1 | 10/2012 | Davis |
| 2013/0077164 A1* | 3/2013 | Davis ............... 359/485.05 |
| 2013/0128358 A1* | 5/2013 | Hanashima ............... 359/487.03 |
| 2013/0201557 A1 | 8/2013 | Davis |
| 2013/0250411 A1 | 9/2013 | Davis |
| 2013/0258471 A1 | 10/2013 | Davis |

FOREIGN PATENT DOCUMENTS

| | | |
|---|---|---|
| CN | 1692291 | 11/2005 |
| DE | 3707984 A1 | 9/1988 |
| DE | 10327963 | 1/2005 |
| DE | 10341596 | 4/2005 |
| DE | 10 2004 04122 | 3/2006 |
| EP | 300563 | 1/1989 |
| EP | 0407830 B1 | 1/1991 |
| EP | 0731456 | 9/1996 |
| EP | 1239308 | 2/2002 |
| EP | 2270553 | 1/2011 |
| JP | 56156815 | 12/1981 |
| JP | 58-042003 | 3/1983 |
| JP | 61122626 | 6/1986 |
| JP | 1028675 | 1/1989 |
| JP | 02-308106 | 12/1990 |
| JP | 2308106 | 12/1990 |
| JP | 3005706 | 1/1991 |
| JP | H03084502 | 4/1991 |
| JP | 3126910 | 5/1991 |
| JP | 04 366916 | 6/1991 |
| JP | 4-12241 | 1/1992 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | 06-174907 | 6/1994 |
| JP | 6202042 | 7/1994 |
| JP | 7005316 | 1/1995 |
| JP | 7072428 | 3/1995 |
| JP | 7-146469 | 6/1995 |
| JP | 7202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 11-014814 | 1/1999 |
| JP | 1-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | H11237507 A | 8/1999 |
| JP | 11-258603 | 9/1999 |
| JP | 11-306581 | 11/1999 |
| JP | 2000-147487 | 5/2000 |
| JP | 2000284117 | 10/2000 |
| JP | 2001074935 | 3/2001 |
| JP | 2003279738 | 10/2003 |
| JP | 2004157159 | 6/2004 |
| JP | 2004309903 | 11/2004 |
| JP | 2005195824 | 7/2005 |
| JP | 2006047813 | 2/2006 |
| JP | 2006-133402 | 5/2006 |
| JP | 2006201540 | 8/2006 |
| JP | 2006/330178 | 12/2006 |
| JP | 2007/58100 | 3/2007 |
| JP | 2007/101859 | 4/2007 |
| JP | 2009204894 | 9/2009 |
| JP | 2009236945 | 10/2009 |
| JP | 2011 248284 | 12/2011 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| RU | 1781659 A1 | 12/1992 |
| SU | 1283685 | 1/1987 |
| WO | WO96/15474 | 5/1996 |
| WO | WO 99/59005 | 11/1999 |
| WO | WO0070386 | 11/2000 |
| WO | WO 01/51964 | 7/2001 |
| WO | WO 02/21205 | 3/2002 |
| WO | WO 02/077588 | 10/2002 |
| WO | WO 03/069381 | 8/2003 |
| WO | WO03/069381 | 8/2003 |
| WO | WO03/107046 | 12/2003 |
| WO | WO2004013684 | 2/2004 |
| WO | WO2005/065182 | 7/2005 |
| WO | WO2005/101112 | 10/2005 |
| WO | WO 2005/123277 | 12/2005 |
| WO | WO2006/014408 | 2/2006 |
| WO | WO 2006/036546 | 4/2006 |
| WO | WO 2011/056496 | 5/2011 |

OTHER PUBLICATIONS

U.S. Appl. No. 13/075,470, filed Mar. 30, 2011, Mark Alan Davis; office action dated Jun. 13, 2013.

Sze, VLSI Technology, $2^{nd}$ Ed.; pp. 198-199; 1988.

Lloyd William Taylor, et al., Manual of Advanced Undergraduate Experiments in Physics, p. 302 (1959).

Flanders, "Application of .100 Å linewidth structures fabricated by shadowing techniques." J. Vac. Sci. Technol., 19(4), Nov./Dec. 1981.

Kuta et al. "Coupled-wave analysis of lamellar metal transmission gratings for the visible and the infrared." J. Opt. Soc. Am. A/vol. 12, No. 5 /May 1995.

Lockbihler et al. "Diffraction from highly conducting wire gratings of arbitrary cross-section." Journal of Modern Optics, 1993, vol. 40, No. 7, pp. 1273-1298.

(56) References Cited

OTHER PUBLICATIONS

Novak et al., "Far infrared polarizing grids for use at cryogenic temperatures." Applied Optics, Aug. 15, 1989/vol. 28, No. 15, pp. 3425-3427.
Auton et al, "Grid Polarizers for Use in the Near Infrared." Infrared Physics, 1972, vol. 12, pp. 95-100.
Stenkamp et al, "Grid polarizer for the visible spectral region." SPIE vol. 2213 pp. 288-296.
Handbook of Optics, 1978, pp. 10-68-10-77.
Handbook of Optics vol. II, $2^{nd}$ Edition, pp. 3.32-3.35.
Glytsis et al, "High-spatial-frequency binary and multilevel stairstep gratings: polarization-selective mirrors and broadband antireflection surfaces." Applied Optics Aug. 1, 1992 vol. 31, No. 22 pp. 4459-4470.
Auton, "Infrared Transmission Polarizers by Photolithography." Applied Optics Jun. 1967 vol. 6, No. 6, pp. 1023-1027.
Haggans et al., "Lamellar gratings as polarization components for specularly reflected beams." Journal of Modern Optics, 1993, vol. 40, No. 4, pp. 675-686.
Nordin et al., "Micropolarizer array for infrared imaging polarimetry." J. Op. Soc. Am. A. vol. 16 No. 5 , May 1999.
Bird et al., "The Wire Grid as a Near-Infrared Polarizer." J. Op. Soc. Am. vol. 50 No. 9 (1960).
Optics $9^{th}$ Edition, pp. 338-339 (1980).
Whitbourn et al, "Phase shifts in transmission line models of thin periodic metal grids." Applied Optics Aug. 15, 1989 vol. 28, No. 15, pp. 3511-3515.
Enger et al, "Optical elements with ultrahigh spatial-frequency surface corrugations." Applied Optics Oct. 15, 1983, vol. 22, No. 20 pp. 3220-3228.
Knop, "Reflection Grating Polarizer for the Infrared." Optics Communications vol. 26, No. 3, Sep. 1978.
Hass et al, "Sheet Infrared Transmission Polarizers." Applied Optics Aug. 1965, vol. 4, No. 8 pp. 1027-1031.
Flanders, "Submicron periodicity gratings as artificial anisotropic dielectrics." Appl. Phys. Lett. 42 (6), Mar. 15, 1983, pp. 492-494.
Li Li et al , "Visible broadband, wide-angle, thin-film multilayer polarizing beam splitter." Applied Optics May 1, 1996, vol. 35, No. 13, pp. 2221-2224.
Sonek et al., "Ultraviolet grating polarizers." J. Vac. Sci. Technol., 19(4), Nov./Dec. 1981, pp. 921-923.
N.M. Ceglio, Invited Review "Revolution in X-Ray Optics." J. X-Ray Science & Tech. 1, 7-78 (1989).
Dainty, et al, "Measurements of light scattering by characterized random rough surface." Waves in Random Media 3 (1991).
DeSanto et al, "Rough surface scattering." Waves in Random Media 1 (1991).
Lavin, "Specular Reflection." Monographs on App. Opt. No. 2.
Zamzicchi et al., "Corrosion Inhibitors for Aluminum Films." David Sarnoff Research Center, Princeton, NJ 08543-5300.
Moshier et al. "The Corrosion and Passively of Aluminum Exposed to Dilute Sodium Sulfate Solutions." Corrosion Science vol. 27. No. 8 pp. 785-801 1987.
Scandurra, et al. "Corrosion Inhibition of Al Metal in Microelectronic Devices Assemble in Plastic Packages." Journal of the Electrochemical Society, 148 (8) B289-B292 (2001).
Takano, Kuniyoshi et al. "Cube polarizers by the use of metal particles in anodic alumina films." Applied Optics, vol. 33, No. 16, 3507-3512, Jun. 1, 1994.
Lopez, et al. "Wave-plate polarizing beam splitter based on a form-birefringent multilayer grating." Optics Letters, vol. 23, No. 20, pp. 1627-1629, Oct. 15, 1998.
Chen, J. et al. "Optimum film compensation modes for TN and VA LCDs." SID 98 Digest, pp. 315-318, 1998.
Richter, Ivan et al. "Design considerations of form birefringent microstructures." Applied Optics, vol. 34, No. 14, pp. 2421-2429, May 10, 1995.
Tyan, Rong-Chung et al. "Design, fabrication, and characterization of form-birefringent multilayer polarizing beam splitter." Optical Society of America, vol. 14, No. 7, pp. 1627-1636, Jul. 1997.

Ho, G H et al. "The mechanical-optical properties of wire-grid type polarizer in projection display system." SID 02 Digest, pp. 648-651, 2002.
Kostal, Hubert, NanoTechnology "using advanced lithography to pattern nano-optic devices." www.solid-state.com, Sep. 2005, p. 26 and 29.
Kostal, Hubert "Nano-optics: robust, optical devices for demanding applications." Military & Aerospace Electronics, Jul. 2005, 6 pages.
Kostal, Hubert "Nano-optic devices enable integrated fabrication." www.laserfocuswold.com, Jun. 2004 pp. 155, 157-159.
Wang, Jian et al. "Free-Space nano-optical devices and integration: design, fabrication, and manufacturing." Bell Labs Technical Journal, 2005 pp. 107-127, vol. 10, No. 3.
Wang et al. "Diffractive optics: nanoimprint lithography enables fabrication of subwavelength optics." LaserFocusWorld, http://lfw.pennet.com/Articles/Article_Display.cf . . . Apr. 19, 2006, 6 pages.
Wang et al. "High-performance nanowire-grid polarizers" Optical Society of America. 2005, pp. 195-197, vol. 30, No. 2.
Wang et al. "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.
Savas et al. "Achromatic interferometric lithography for 100-nm-period gratings and grids." Journal Vac. Sci. Technology B, Nov./Dec. 1995, pp. 2732-2735, vol. 13, No. 6.
Haisma et al. "Mold-assisted nanolithography: a process for reliable pattern replication." Journal Vac. Sci. Technology B, Nov./Dec. 1996, pp. 4124-4128, vol. 14, No. 6.
Wang et al. "High-performance large-area ultra-broadband (UV to IR) nanowire-grid polarizers and polarizing beam-splitters." Proc. of SPIE 2005, pp. 1-12, vol. 5931.
Wang et al. "Monolithically integrated isolators based on nanowire-grid polarizers." IEEE, Photonics Technology Letters, Feb. 2005, pp. 396-398, vol. 17, No. 2.
Deng et al. "Multiscale structures for polarization control by using imprint and UV lithography." Proc. of SPIE, 2005, pp. 1-12. vol. 6003.
Kostal et al. "MEMS Meets Nano-optics The marriage of MEMES and nano-optics promises a new and viable platform for tunable optical filters." www.fiberoptictechnology.net, Fiber Optic Technology, Nov. 2005, pp. 8-13.
Kostal et al. "Adding parts for a greater whole." SPIE's oeMagazine, May 2003, pp. 24-26.
Deng et al. "Wideband antireflective polarizers based on integrated diffractive multilayer microstructures." Optics Letters, Feb. 1, 2006, pp. 344-346, vol. 31., No. 3.
Chen, et al. "Novel polymer patterns formed by lithographically induced self-assembly (LISA).", American Chemical Society, Jan. 2005, pp. 818-821, vol. 21, No. 3.
Park, et al. "Nano-optics redefine rules for optical processing." NanoOptic Corp, 3 pages.
Baur, "A new type of beam splitting polarizer cube." Meadowlark Optics, 2005, pp. 1-9.
Zhang et al., "A broad-angle polarization beam splitter based on a simple dielectric periodic structure." Optices Express, Oct. 29, 2007, 6 pages, vol. 15, No. 22.
Compact Disc Audio, http://hyperphusics.phy-astr.gsu.edu/hbase/audio/cdplay.html.
Robinson et al., "Wide Field of View Compensation Scheme for Cube Polarizing Beam Splitters." SID 03 Digest, pp. 1-4, www.colorlink.com.
ProFlux, www.moxtek.comm pp. 1-4.
Pentico, Eric et al., "New, High Performance, Durable Polarizers for Projection Displays." SID 01 Digest, 2001, pp. 1287-1289.
Brummelaar et al., "Beam combining optical components," Chara Technical Report, Jan. 5, 1998, pp. TR61-1 to TR 61-17, No. 61.
Bruzzone, et al.,"High-performance LCoS optical engine using cartesian polarizer technlogy," SID 03 Digest, 2003, pp. 1-4.
Fritsch, et al., "A liquid-crystal phase modulator for large-screen projection." IEEE, Sep. 1989, pp. 1882-1887, vol. 36, No. 9.
Deguzman et al., "Stacked subwavelength gratings as circular polarization filters." Applied Optices, Nov. 1, 2001, pp. 5731-5737, vol. 40, No. 31.

(56) References Cited

OTHER PUBLICATIONS

Tyan et al., "Polarizing beam splitter based on the anisotropic spectral reflectivity characteristic of form-birefringent multilayer gratings." Optics Letters, May 15, 1996, pp. 761-763, vol. 21, No. 10.
Tamada et al., "Aluminum-wire grid polarizer for a compact magneto-optic pickup device." 2 pages.
Maystre & Dainty, Modern Analysis of Scattering Phenomena Proceeding from International Workshop held at Domaine deTournon, Aix en Provence, France Sep. 5-8, 1990.
Wang, et al., "Innovatic High-Performance Nanowrie-Grid Polarizers and integrated Isolators," IEEE Journal of Selected Topics in Quantum Electronics, pp. 241-253, vol. 11 No. 1 Jan./Feb. 2005.
U.S. Appl. No. 13/234,444, filed Aug. 16, 2011, Raymond T. Perkins.
U.S. Appl. No. 13/075,470, filed Mar. 30, 2011, Mark Alan Davis.
U.S. Appl. No. 13/224,719, filed Sep. 2, 2011, Mark Alan Davis.
U.S. Appl. No. 13/495,296, filed Jun. 13, 2012, Michael Lines.
U.S. Appl. No. 13/326,566, filed Dec. 15, 2011, Mark Alan Davis; office action dated Dec. 16, 2013.
U.S. Appl. No. 14/035,478, filed Sep. 24, 2013, Mark Davis; office action dated Dec. 27, 2013.
U.S. Appl. No. 13/495,296, filed Jun. 13, 2012, Michael Lines; office action dated Sep. 25, 2013.
U.S. Appl. No. 13/075,470, filed Mar. 30, 2011, Mark Alan Davis; office action dated Oct. 7, 2013.
U.S. Appl. No. 13/224,719, filed Sep. 2, 2011, Mark Alan Davis; notice of allowance dated Oct. 1, 2013.
PCT/US2012/043979; Filed Sep. 2, 2011; Moxtek, Inc. et al.; international search report dated Jan. 31, 2013.

\* cited by examiner

US 8,922,890 B2

POLARIZER EDGE RIB MODIFICATION

FIELD OF THE INVENTION

The present application is related generally to polarizers.

BACKGROUND

Polarizers, such as wire grid polarizers for example, typically have long, thin ribs disposed on a substrate. The ribs, and spacing between the ribs, can be significantly smaller than a wavelength of incoming light. For example, rib width, and spacing between ribs for a visible light polarizer can be around 70 nanometers. A length of the ribs, however, can be very long, such as several millimeters or several centimeters.

These polarizers, therefore, can have long, narrow channels. Fluids can easily wick up into these channels due to capillary action. Such fluids can substantially degrade polarizer performance. A typical source of such fluids is from human hands. During handling, natural oils on people's hands can wick up into the polarizer channels, resulting in degraded polarizer performance. Another source of such fluids is condensation along edges of a holder, or condensation during storage. This condensation can also result in degraded polarizer performance. It would be beneficial to allow handling, clamping, or storage of polarizers without the problem of oils, water, or other fluids, wicking up into polarizer channels.

SUMMARY

It has been recognized that it would be advantageous to provide a polarizer that can be more easily handled, stored, clamped, etc. with less risk of oils, water, or other fluids, wicking up into polarizer channels.

In one embodiment, the present invention is directed to a polarizer that satisfies the need for improved handle-ability. The polarizer comprises a substrate having a first surface bordered by an edge, an array of parallel, elongated ribs disposed over a portion of the first surface of the substrate, including a standard region and a rib modification region. The standard region can include ribs having a standard characteristic. The standard region can be configured to polarize incident light. The rib modification region can be disposed along at least a segment of the edge of the substrate between the edge and at least a portion of the standard region. The rib modification region can comprise modified ribs modified from the standard characteristic to have a different characteristic.

In another embodiment, the present invention is directed to a method for making a polarizer that satisfies the need for improved handle-ability. The method comprises providing a polarizer including an array of parallel, elongated ribs disposed over a substantial portion of a surface of a substrate and modifying the ribs along at least a segment of an edge of the substrate.

DEFINITIONS

Figure 1:
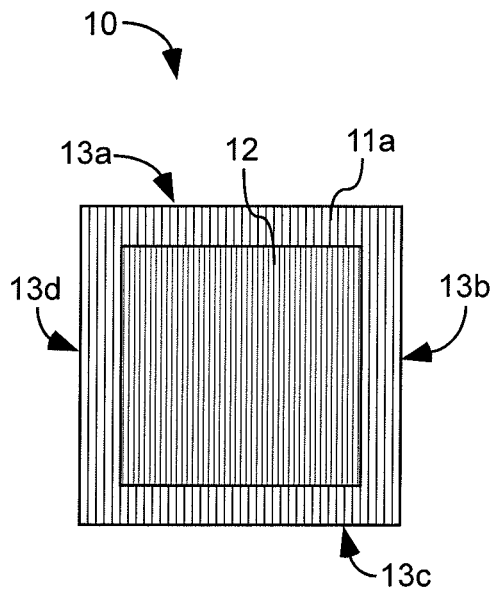
FIG. 1 is a schematic top view of a polarizer, including a standard region 12 and a rib modification region 11a, in accordance with an embodiment of the present invention.

As used herein, the term "rib modification region" refers to a region on a polarizer in which ribs have been modified, such as by for example fusing adjacent ribs together, decreasing the height of ribs, increasing the width of ribs, changing the shape of ribs, ablating part of the ribs, or disposing a material between the ribs, such that ribs in the "rib modification region" are substantially different from ribs in the standard region.

As used herein, the term "rib-less region" refers to a region on a polarizer in which ribs have been substantially removed.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have about the same overall result as if absolute and total completion were obtained. The use of "substantially" is equally applicable when used in a negative connotation to refer to the complete or near complete lack of an action, characteristic, property, state, structure, item, or result.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1-19, polarizers are shown comprising a substrate 53 having a first surface 54 bordered by an edge 13, an array of parallel, elongated ribs 51 disposed over a portion of the first surface 54 of the substrate 53, including a central standard region 12 and a rib modification region 11. The standard region 12 can include ribs 51a-e having a standard characteristic and can be configured to polarize incident light. Ribs 51a-e in the standard region can cover a majority of the first surface 54 of the substrate. The standard region 12 can be a single undivided region.

The rib modification region 11 can be disposed along at least a segment of the edge 13 of the substrate 53 between the edge 13 and at least a portion of the standard region 12. The rib modification region 11 can comprise modified ribs 51g-r modified from the standard characteristic to have a different characteristic.

Due to the different characteristic of the rib modification region 11, capillary action of the rib modification region 11 can be substantially less than capillary action of the standard region 12. For example, ribs 51g-r in the rib modification region 11 can be rounder, wider, or shorter than ribs 51a-e in the standard region 12. Ribs 51g-r in the rib modification region 11 can be fused together, partially removed, or irregular shaped. Ribs 51g-r in the rib modification region 11 can include a material disposed between ribs. These modifications can result in reduced capillary action.

As shown in FIG. 1, the edge 13 of polarizer 10 can include four segments 13a-d around a perimeter of the polarizer 10. Each segment can be a substantially straight portion of the edge 13 between two corners of the edge. The rib modification region 11a can extend along the entire edge 13, or extend along the entire perimeter of the polarizer 10.

In another embodiment, the rib modification region 11 can extend along only a portion of the edge 13, such as between 20% to 60% of the edge 13 for example. The rib modification region can separate the standard region 12 from at least 50% of the edge 13 of the substrate in another embodiment. The rib modification region 11 can extend along a single segment of the edge or along multiple segments of the edge.

Figure 2:
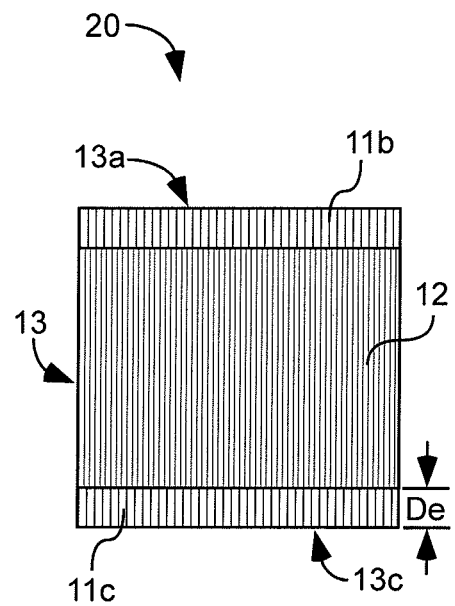
FIG. 2 is a schematic top view of a polarizer, including a standard region 12 and rib modification regions 11b-c, in accordance with an embodiment of the present invention.

As shown in FIG. 2, the rib modification region 11 of polarizer 20 can comprise two rib modification regions 11b-c extending along two different segments 13a & 13c of the edge 13 on opposing sides of the polarizer 20. The two segments 13a & 13c can be perpendicular to the array of ribs in the standard region.

The rib modification region 11 can extend, from the edge 13 inward in a direction substantially perpendicular to the edge, for a distance De of at least 1 micrometer in one embodiment, for a distance De of at least 10 micrometers in another embodiment, for a distance De of at least 100 micrometers in another embodiment, for a distance De of at least 1 millimeter in another embodiment, or for a distance De of at least 5 millimeters in another embodiment. The rib modification region can extend for a distance De of between 1 micrometer to 1 millimeter, from the edge inward, in a direction substantially perpendicular to the edge, in another embodiment. The length of this distance De can depend on polarizer handling and useful polarizing area needs.

Note that although this distance De is shown on FIG. 2, which has two rib modification regions 11b-c extending along two different segments 13a & 13c of the edge 13 on opposing sides of the polarizer 20, this distance De, and discussion above about this distance, may be applicable to any embodiments described herein. For example, this distance De may be applicable if the rib modification region extends all the way around the edge 13 of the polarizer 10, as shown in FIG. 1, or if the rib modification region extends only part way along a segment of an edge, as shown in FIGS. 3-4.

Figure 3:
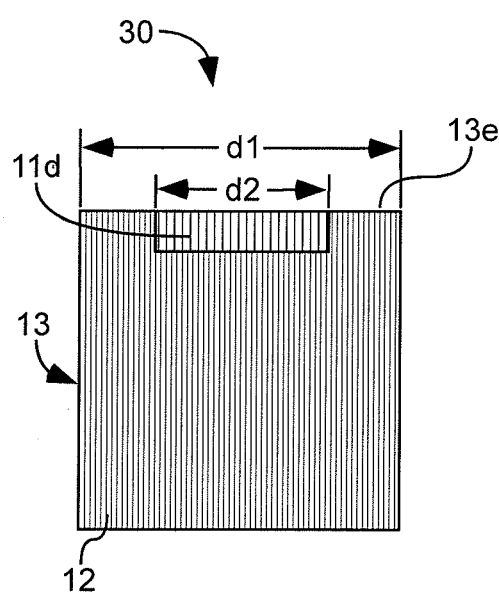
FIG. 3 is a schematic top view of a polarizer, including a standard region 12 and a rib modification region 11d, in accordance with an embodiment of the present invention.
Figure 4:
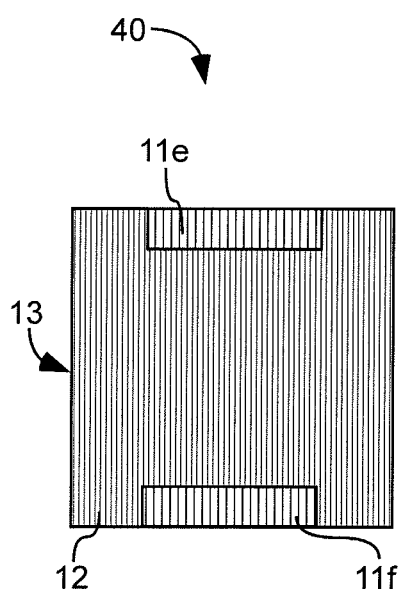
FIG. 4 is a schematic top view of a polarizer, including a standard region 12 and rib modification regions 11e-f, in accordance with an embodiment of the present invention.

As shown in FIG. 3, the rib modification region 11 of polarizer 30 can extend along a portion of a segment 13e of an edge 13, wherein the segment is defined as a substantially straight portion of the edge 13 between two corners of the edge. The rib modification region 11 can extend along at least 50% of the segment in one embodiment $$\left(1 - \frac{d1 - d2}{d1} > 0.5\right),$$

along at least 70% of the segment in another embodiment $$\left(1 - \frac{d1 - d2}{d1} > 0.7\right),$$

along at least 90% of the segment in another embodiment $$\left(1 - \frac{d1 - d2}{d1} > 0.9\right),$$

or between 50% and 90% of the segment in another embodiment $$\left(0.5 < 1 - \frac{d1 - d2}{d1} < 0.9\right).$$

As shown in FIG. 4, the rib modification region 11e-f, of polarizer 40, can extend part-way along multiple segments of the edge 13.

As shown in FIGS. 1-4, the standard region 12 can cover substantially more than the rib modification region 11 of the first surface 54 of the substrate 53. The standard region 12 can cover at least 10 times more than the rib modification region 11 of the first surface 54 of the substrate 53 in one embodiment, or at least 100 times more than the rib modification region 11 of the first surface 54 of the substrate 53 in another embodiment.

As shown in FIGS. 1-4, the rib modification region 11 and the standard region 12 together can cover substantially all of the first surface 54 of the substrate 53. Alternatively, another region can exist over part of the first surface 54 of the substrate 53.

Figure 5:
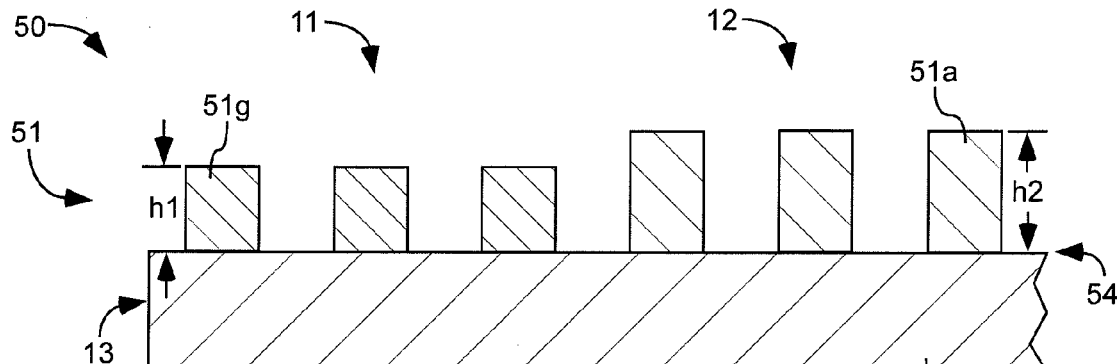
FIG. 5 is a schematic cross-sectional side view of a polarizer, including a standard region 12 and a rib modification region 11, in accordance with an embodiment of the present invention.

As shown on polarizer 50 in FIG. 5, the different characteristic can include rib height. Ribs 51g in the rib modification region 11 can comprise ribs that are substantially shorter than ribs 51a in the standard region 12 (h1<h2). All ribs 51g in the rib modification region 11 can be at least 25% shorter than all ribs 51a in the standard region 12 in one embodiment $$\left(\frac{h2 - h1}{h2} > 0.25\right),$$

or at least 50% shorter in another embodiment $$\left(\frac{h2 - h1}{h2} > 0.5\right).$$

A transition region 84, not shown in FIG. 5 (described below in reference to FIG. 8), can exist between the rib modification region 11 and the standard region 12. Ribs 51f in the transition region 84 can have a height that is taller than ribs 51g in the rib modification region 11 but shorter than ribs 51a in the standard region 12.

Figure 6:
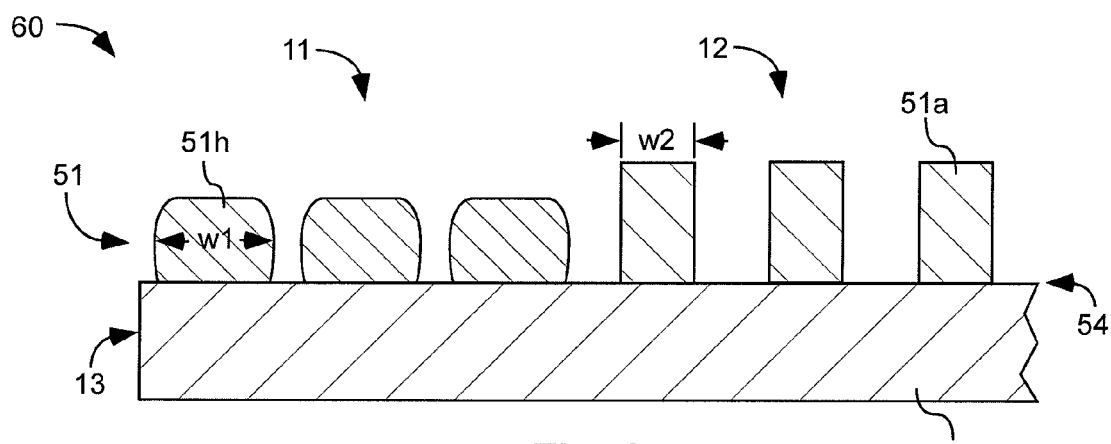
FIG. 6 is a schematic cross-sectional side view of a polarizer, including a standard region 12 and a rib modification region 11, in accordance with an embodiment of the present invention.

As shown on polarizer 60 in FIG. 6, the different characteristic can include rib width w. Ribs 51h in the rib modification region 11 can comprise ribs that are substantially wider than ribs 51a in the standard region 12 (w1>w2). All ribs 51h in the rib modification region 11 can be at least 25% wider than all ribs 51a in the standard region 12 in one embodiment $$\left(\frac{w1 - w2}{w1} > 0.25\right),$$

or at least 50% wider in another embodiment $$\left(\frac{w1 - w2}{w1} > 0.5\right).$$

A transition region 84, not shown in FIG. 6 (described below in reference to FIG. 8), can exist between the rib modification region 11 and the standard region 12. Ribs 51f in the transition region 84 can have a width that is narrower than ribs 51h in the rib modification region 11 but wider than ribs 51a in the standard region 12. Rib width is defined as a measurement in a direction perpendicular to rib height h.

Figure 7:
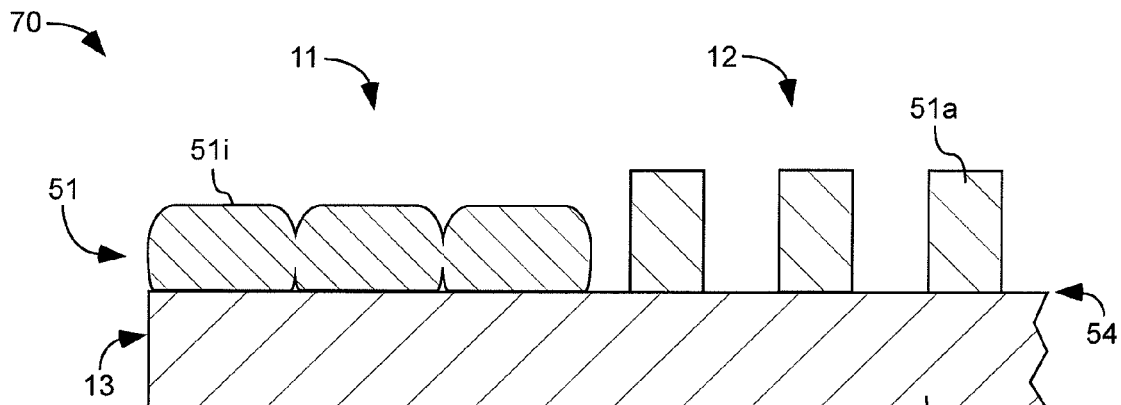
FIG. 7 is a schematic cross-sectional side view of a polarizer, including a standard region 12 and a rib modification region 11, in accordance with an embodiment of the present invention.

As shown on polarizer 70 in FIG. 7, the rib modification region 11 can comprise adjacent ribs 51i fused together. The ribs 51i can be melted or fused by thermal energy (heat). This may be accomplished by a laser or hot wire directed along the edge 13 of the polarizer 70. As shown on polarizer 160 in FIG. 16, the melting or fusing process can cause fused ribs 51q to attach to adjacent ribs (such as adjacent ribs in the standard region 12, or adjacent ribs in the transition region 84, for example). The fused or melted ribs 51i can separate from the substrate 53 as described below in reference to FIG. 16.

Figure 8:
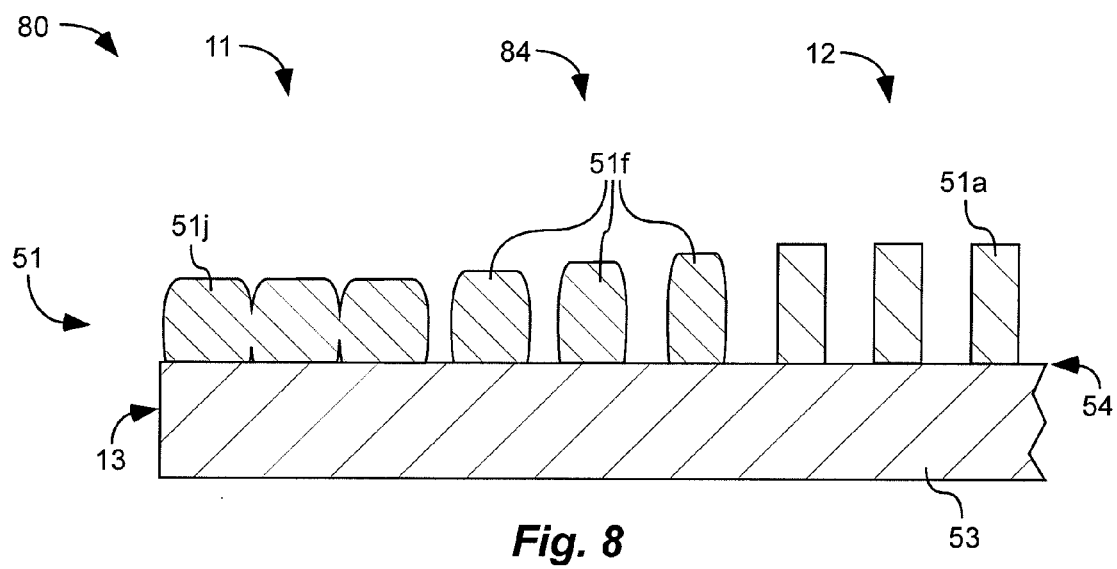
FIG. 8 is a schematic cross-sectional side view of a polarizer, including a standard region 12, a rib modification region 11, and a transition region 84, in accordance with an embodiment of the present invention.

As shown on polarizer 80 in FIG. 8, a transition region 84 can exist between the rib modification region 11 and the standard region 12. Ribs 51f in the transition region 84 can have a transitional characteristic between the rib modification region 11 and the standard region 12. If the different characteristic of the rib modification region 11 is width, then ribs 51f in the transition region 84 can have a width that is intermediary between ribs 51j in the rib modification region 11 and ribs 51a in the standard region 12. If the different characteristic of the rib modification region 11 is height, then ribs 51f in the transition region 84 can have a height that is intermediary between ribs 51j in the rib modification region 11 and ribs 51a in the standard region 12. If the different characteristic of the rib modification region 11 is shape, then ribs 51f in the transition region 84 can have a shape that is intermediary between ribs 51j in the rib modification region 11 and ribs 51a in the standard region 12. The various different characteristics between the rib modification region 11 and ribs 51a in the standard region 12 can be combined and the transition region 84 can include ribs 51 that have an intermediate characteristic based on all of these different characteristics combined.

Figure 9:
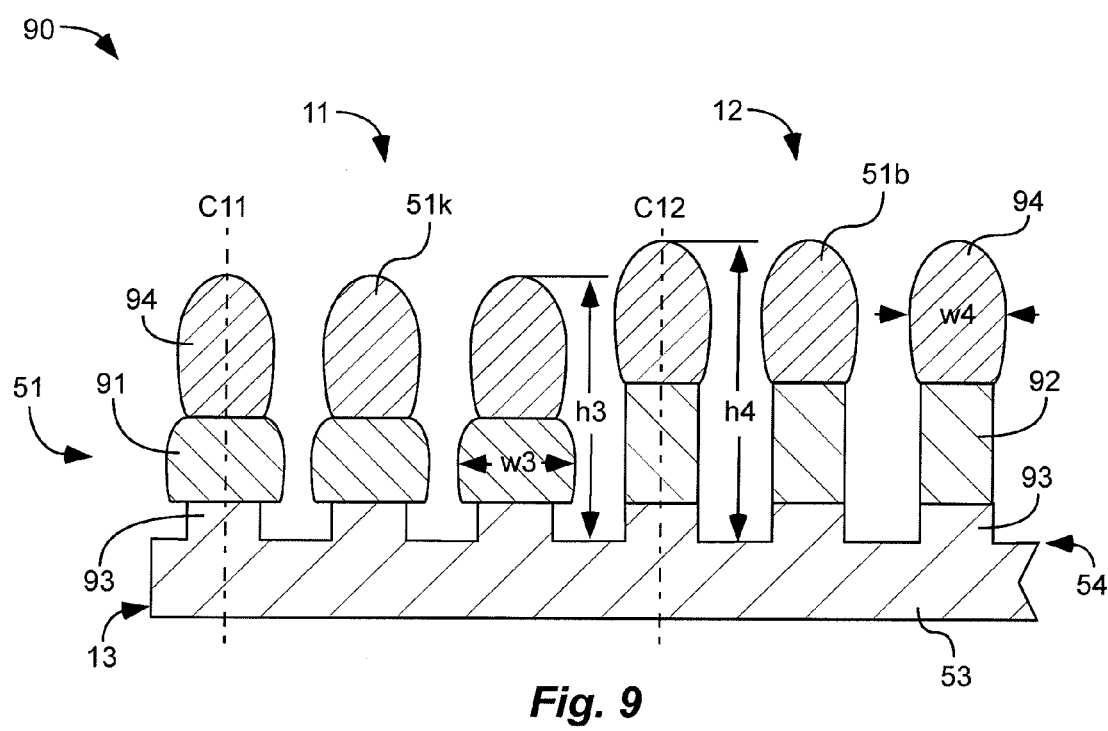
FIG. 9 is a schematic cross-sectional side view of a polarizer, including a standard region 12 with ribs including substrate ribs 93, metal wires 92, and segmented dielectric ribs 94; and a rib modification region 11 with ribs including substrate ribs 93, metal wires 91, and segmented dielectric ribs 94; in accordance with an embodiment of the present invention.
Figure 10:
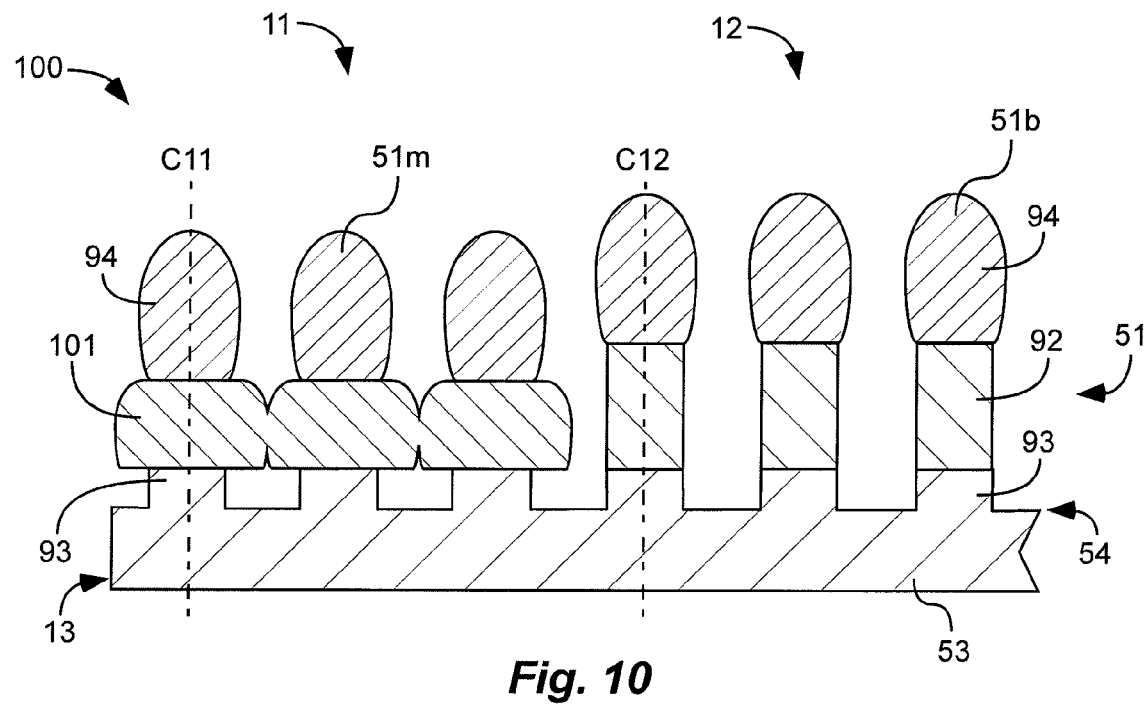
FIG. 10 is a schematic cross-sectional side view of a polarizer, including a standard region 12 with ribs including substrate ribs 93, metal wires 92, and segmented dielectric ribs 94 and a rib modification region 11 with ribs including substrate ribs 93, metal wires 101, and segmented dielectric ribs 94; in accordance with an embodiment of the present invention.

As shown on polarizers in FIGS. 9-14, ribs 51 in both the rib modification region 11 and the standard region 12 can comprise substrate ribs 93 formed in the substrate 53 and extending from the substrate 53. As shown in FIGS. 9-10, polarizers 90 and 100 can include metal wires 91 or 101 and 92. Segmented dielectric ribs 94 can be disposed over the substrate ribs 93. Although FIGS. 9-10 show dielectric ribs 94 disposed over metal wires 91, the order may be reversed, such that metal wires 91 are disposed over dielectric ribs 94. Substrate ribs 93 are described more fully in U.S. Pat. No. 6,122, 103, and dielectric ribs 94 are described more fully in U.S. patent application Ser. No. 13/075,470; both incorporated herein by reference.

The different characteristic can be a difference of rib width w (w3>w4) and/or a difference in height (h4>h3). Rib width can be defined as a maximum width of the rib, whether this maximum occurs in the substrate ribs 93, the metal wires 91 or 101 and 92, or the segmented dielectric ribs 94. The metal wires 91 in the rib modification region 11 can be melted partially or totally to create the different characteristic. Polarizer 100 in FIG. 10 includes metal wires 101 in the rib modification region 11 that have been fused together whereas metal wires 92 in the standard region 12 can comprise separate metal wires 92 (adjacent metal wires 92 disposed over adjacent substrate ribs 93 that are physically separate one from another). The metal wires 101 can attach to adjacent wires or ribs and can separate from the substrate, similar to the structure shown in FIG. 16.

As indicated by rib center line C11-12 in FIGS. 9-10, a majority of segmented dielectric ribs 94 can be substantially aligned with underlying substrate ribs 93 in both the rib modification region 11 and in the standard region 12. As shown in FIG. 10, by selection of dielectric rib 94 material (such as high melting point material for example), and careful heating to melt metal wires 101 in the rib modification region 11, the segmented dielectric ribs 94 can be substantially aligned C11 with substrate ribs 93, even after metal wires 101 have melted or fused together.

Figure 11:
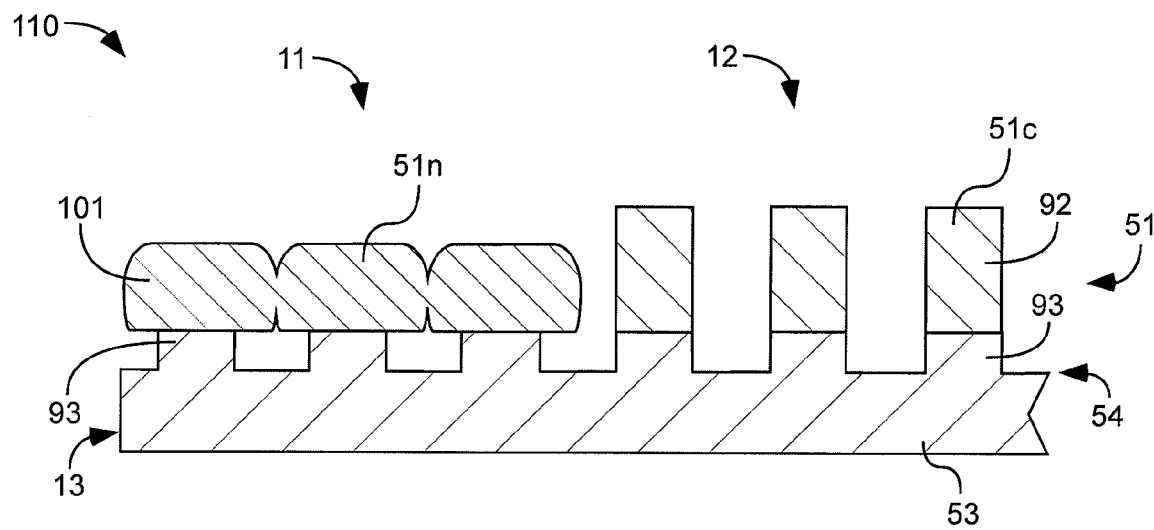
FIG. 11 is a schematic cross-sectional side view of a polarizer, including a standard region 12 with ribs including substrate ribs 93 and metal wires 92 and a rib modification region 11 with ribs including substrate ribs 93 and metal wires 101; in accordance with an embodiment of the present invention.

As shown on polarizer 110 in FIG. 11, ribs 51n in the rib modification region 11 can comprise metal wires 101 over substrate ribs 93. Ribs 51c in the standard region 12 can comprise metal wires 92 over substrate ribs 93. Tops and sides of wires 101 and 92 can be free of other layers of material, other than possibly a very thin coating for corrosion resistant material (very thin meaning<1 nm, <5 nm, or <10 nm thick layer for example). Metal wires 101 in the rib modification region can attach to adjacent wires or ribs and can separate from the substrate, similar to the structure shown in FIG. 16.

Figure 12:
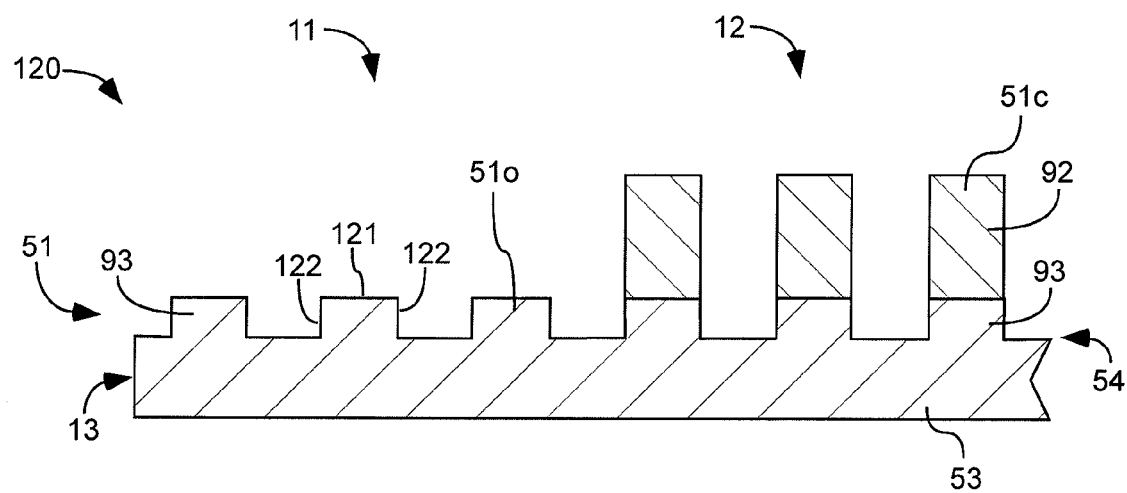
FIG. 12 is a schematic cross-sectional side view of a polarizer, including a standard region 12 with ribs including substrate ribs 93 and metal wires 92, and a rib modification region 11 with ribs including substrate ribs 93 having a top 121 and sides 122 that are substantially free of other rib material; in accordance with an embodiment of the present invention.
Figure 13:
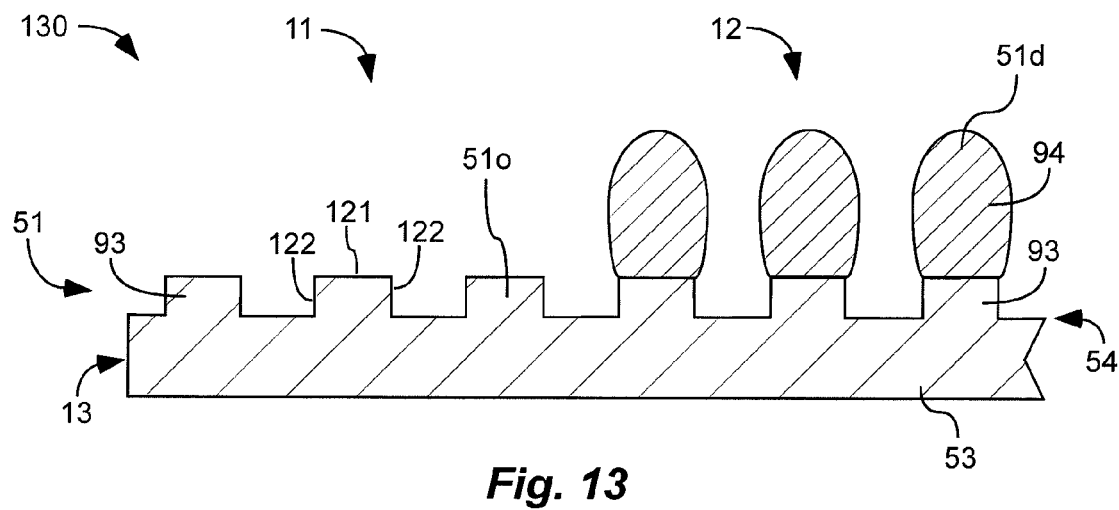
FIG. 13 is a schematic cross-sectional side view of a polarizer, including a standard region 12 with ribs including substrate ribs 93 and dielectric ribs 94 and a rib modification region 11 with ribs including substrate ribs 93 having a top 121 and sides 122 that are substantially free of other rib material; in accordance with an embodiment of the present invention.
Figure 14:
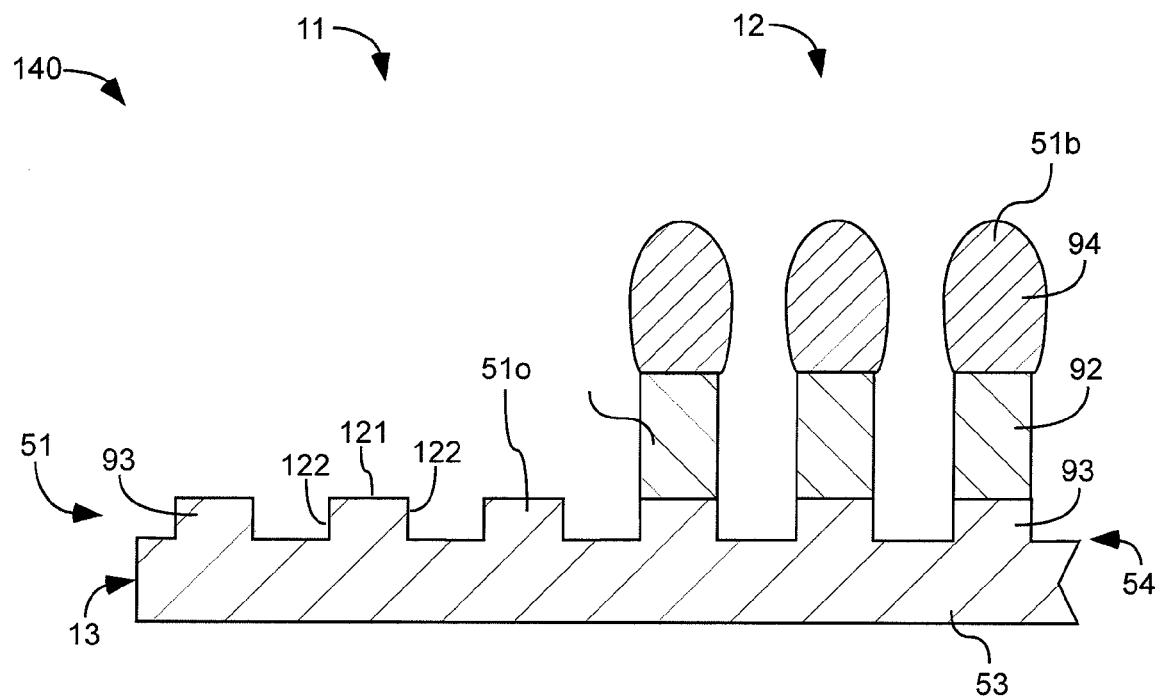
FIG. 14 is a schematic cross-sectional side view of a polarizer, including a standard region 12 with ribs including substrate ribs 93, metal wires 92, and dielectric ribs 94, and a rib modification region 11 with ribs including substrate ribs 93 having a top 121 and sides 122 that are substantially free of other rib material; in accordance with an embodiment of the present invention.

As shown on polarizers 120, 130, and 140 in FIGS. 12-14, ribs 51o in the rib modification region 11 can comprise substrate ribs 93 having sides 122 and a top 121 that are substantially free other rib material. As shown in FIG. 12, ribs 51c in the standard region 12 can comprise metal wires 92 disposed on top of substrate ribs 93. As shown in FIG. 13, ribs 51d in the standard region 12 can comprise dielectric ribs 94 disposed on top of substrate ribs 93. As shown in FIG. 14, ribs 51b in the standard region 12 can comprise metal wires 92 and dielectric ribs 94, in either order, disposed on top of substrate ribs 93.

Figure 15:
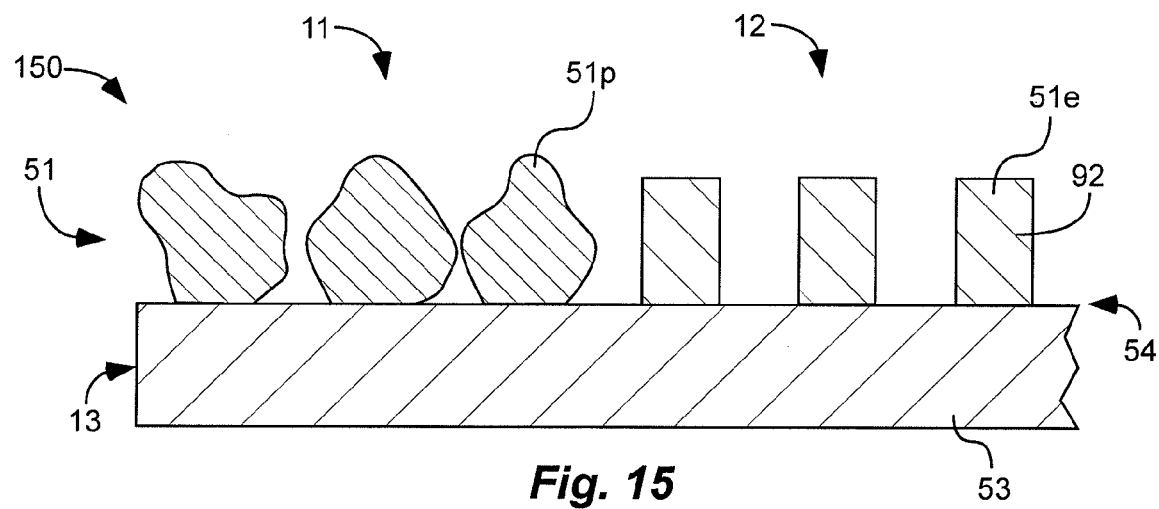
FIG. 15 is a schematic cross-sectional side view of a polarizer, including a standard region 12 with ribs having a substantially rectangular cross-sectional profile and a rib modification region 11 with ribs having an irregular cross-sectional profile, in accordance with an embodiment of the present invention.

As shown on polarizer 150 in FIG. 15, the different characteristic can be rib shape. The rib modification region 11 can comprise ribs 51p that include an irregular cross-sectional profile (not a standard shape such as square, rectangular, circular, elliptical, triangular, etc.) and the standard region 12 can comprise ribs 51e that have a substantially rectangular cross-sectional profile.

Figure 16:
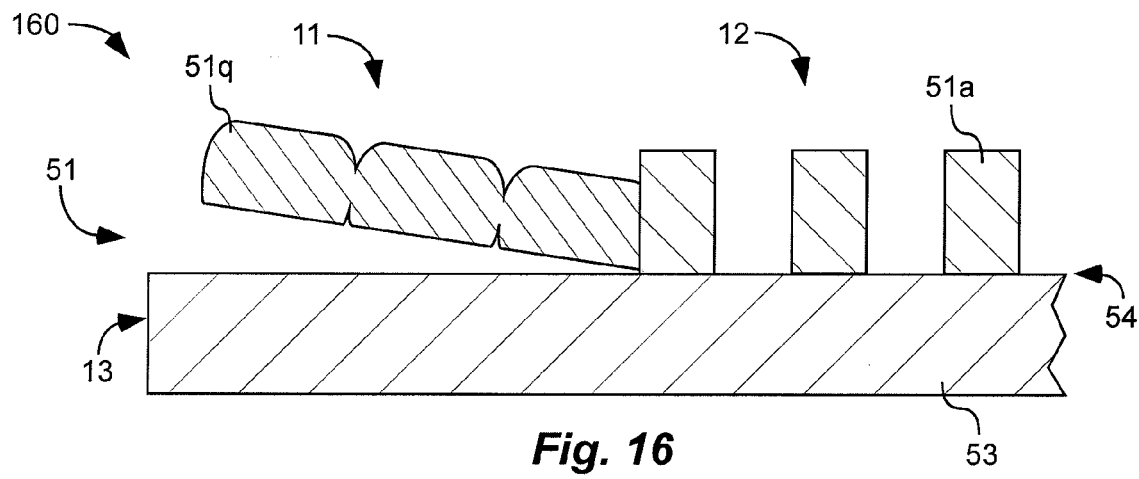
FIG. 16 is a schematic cross-sectional side view of a polarizer, including a standard region 12, and a rib modification region 11 in which fused ribs attach to adjacent ribs and separate from the substrate, in accordance with an embodiment of the present invention.

As shown on polarizer 160 in FIG. 16, ribs 51q in the rib modification region can comprise ribs 51q that are fused together. Fused ribs 51q can attach to adjacent ribs (such as ribs 51a in the standard region, or ribs 51f in the transition region 84 for example), and can separate from the substrate. The heating process can cause ribs 51q in the rib modification region 11 to pull away from the substrate.

Figure 17:
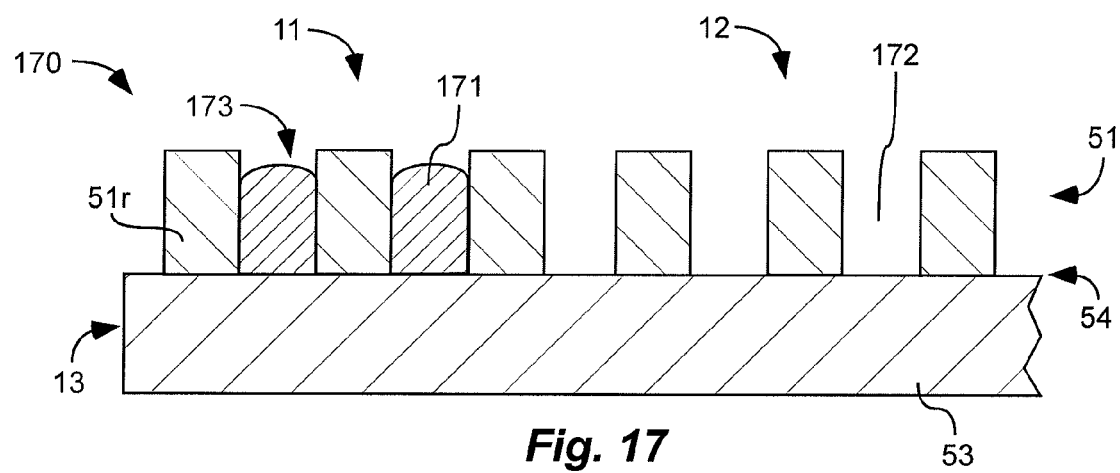
FIG. 17 is a schematic cross-sectional side view of a polarizer, including a standard region 12, and a rib modification region 11 in which a material 171 is disposed between ribs 173, in accordance with an embodiment of the present invention.
Figure 18:
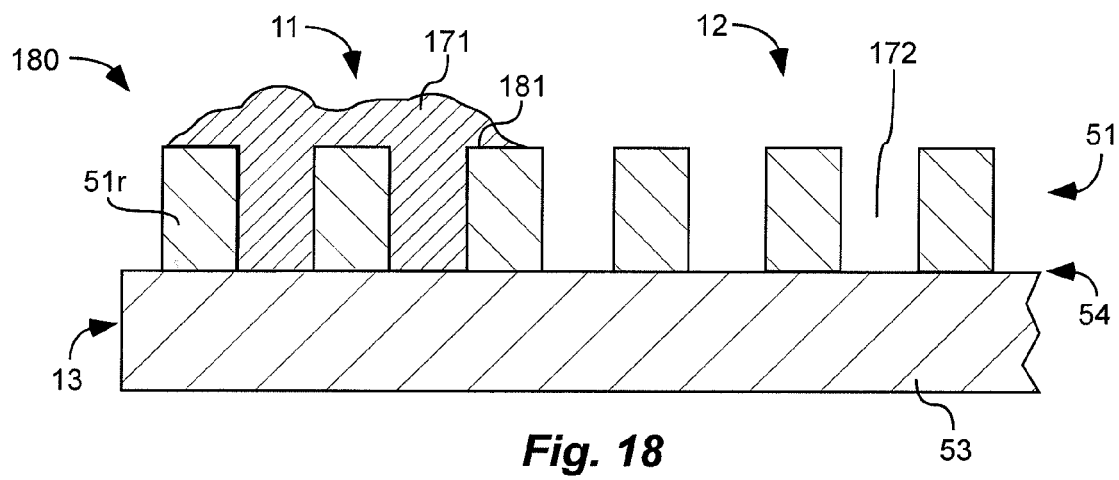
FIG. 18 is a schematic cross-sectional side view of a polarizer, including a standard region 12, and a rib modification region 11 in which a material 171 is disposed between ribs 173, and on top of ribs 181, in accordance with an embodiment of the present invention.

As shown on polarizers 170 and 180 in FIGS. 17-18, gaps 172 between ribs 51a in the standard region 12 can comprise air and can be substantially free of a material, such as a resist or polymer. Gaps 173 between ribs 51r in the rib modification region 11 can comprise a material such as a polymer or resist 172. The polymer or resist 172 can be a material that becomes soluble or insoluble upon exposure to light or heat. The material 171 can partially fill gaps 173 between ribs 51r in the rib modification region 11, as shown in FIG. 17. The material 171 can completely fill gaps 173 between ribs 51r in the rib modification region 11, as shown in FIG. 18. The material 171 can partially or completely cover tops 181 of ribs 51r in the rib modification region, as shown in FIG. 18.

Modification of ribs in the rib modification region 11, can result in reducing or destroying the ability of the rib modification region 11 to polarize light. Polarization contrast, defined as transmission of desired polarization (Tp) divided by transmission of undesired polarization (Ts) is an indication of the ability of a polarizer to effectively polarize light. Polarization contrast in the rib modification region 11 can be less than 10 in one embodiment. Polarization contrast in the standard region 12 can be greater than 40 in one embodiment, greater than 100 in another embodiment, greater than 1000 in another embodiment, or greater than 10,000 in another embodiment.

The various polarizers described herein can be secured in a mount, such as a clamp. The clamp can cover all or a portion of the rib modification region 11. The clamp can avoid covering, or clamping, the standard region 12, thus allowing the entire standard region to be used for polarization. The rib modification region 11 can help avoid condensation along edges of the clamp from wicking between wires of the standard region 12.

Figure 19:
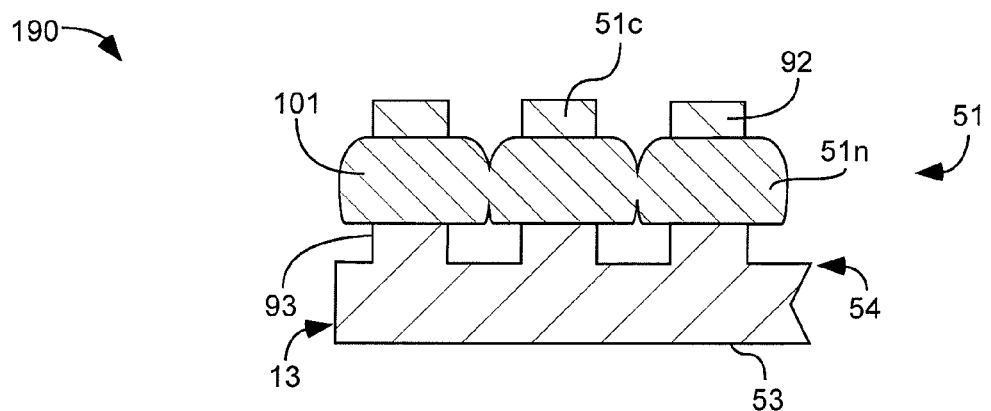
FIG. 19 is a schematic cross-sectional side view of a polarizer, showing the rib modification region in front of the standard region, in accordance with an embodiment of the present invention.

The rib modification regions 11 in FIGS. 8-18 are illustrated with the rib modification regions 11 extending along a segment of the edge 13 that is parallel to the array of ribs 51a-c in the standard region 12 (such as segments of the edge 13b and 13d shown in FIG. 1). These figures are drawn in this way for easier illustration of the invention; however, it can be more important to have the rib modification region 11 extending along segment(s) of the edge 13 that are perpendicular to the array of ribs in the standard region (such as having the rib modification region 11b-c extending along segments of the edge 13a and 13c shown in FIG. 2). Polarizer 190 shown in FIG. 19 is drawn to illustrate this latter version. Having the rib modification region 11 extending along segment(s) of the edge 13 that are perpendicular to the array of ribs in the standard region 12, such as is shown in FIGS. 2 and 19, can be helpful by acting as a barrier to prevent fluids from being drawn into channels between the wires 51 in the standard region 12.

Figure 20:
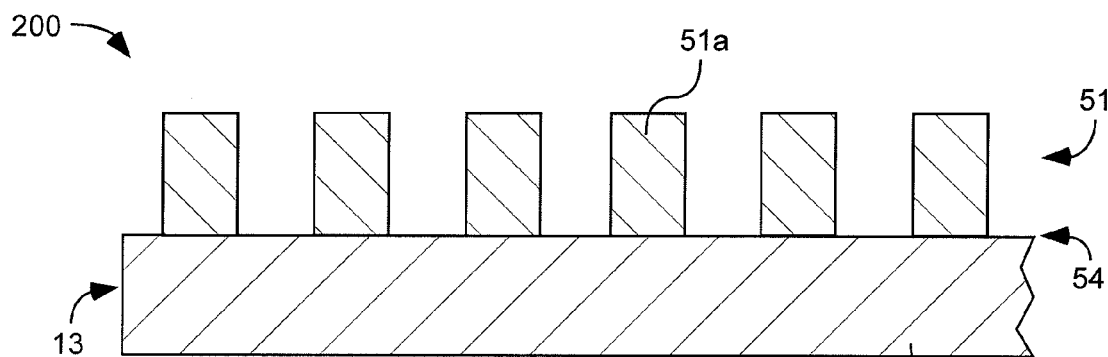
FIG. 20 is a schematic cross-sectional side view of a polarizer prior to modifying ribs; in accordance with an embodiment of the present invention.

How to Make:

To make the various polarizers described herein, having a standard region 12 and a modified region (rib modification region 11 or rib-less region 211): First, provide a polarizer including an array of parallel, elongated ribs disposed over a substantial portion of a surface of a substrate (see polarizer 200 in FIG. 20). Second, modify the ribs along at least a segment of an edge of the substrate, forming a modified region (rib modification region 11 or rib-less region 211) having different characteristics than the standard region 12, such that capillary action of the modified region is substantially less than capillary action of the standard region 12.

In one embodiment, modifying can include modifying the ribs for a distance of between 1 micrometer to 1 millimeter from the edge inward in a direction substantially perpendicular to the edge. In another embodiment, modifying can include modifying the ribs along at least 30% of a distance along the edge of the substrate.

In one embodiment, thermal energy can be used for melting a portion of the ribs along the edge of the substrate. The thermal energy can melt a metallic portion of the ribs. The thermal energy can be a laser or a hot wire. FIGS. 7-8, 10-11 indicate that a portion of the ribs 51 in the rib modification region 11 may have been melted. Ribs 51 can comprise a material that has a melting point that is substantially less than a melting point of the substrate 53, allowing the ribs 51, or portions of the ribs 51, to melt while avoiding or minimizing melting of the substrate 53. For example, the ribs 51 can comprise aluminum and the substrate 53 can comprise glass.

In another embodiment, modifying can include applying a material over the ribs; activating the material in the modified region 11 only; and removing the non-activated material from the standard region 12. The material can be a resist. The resist can be activated by methods such as heat and/or electromagnetic energy (ultraviolet light for example). For example, a negative resist can be applied over the ribs. Activation, of the resist in the modified region 11, can polymerize or cross-link the resist. Resist in the non-activated areas (the standard region 12) can be removed by the developer solution, whereas polymerized resist in the modified region 11 can remain.

In another embodiment, modifying can include applying a material over the ribs; degrading the material in the standard region 12; and removing the degraded material from the standard region 12. The material can be a resist. The resist can be degraded by methods such as heat and/or electromagnetic energy (ultraviolet light for example). For example, a positive resist can be applied over the ribs. Activation of resist in the standard region 12 can degrade the resist, such as by breaking chemical bonds of long chain polymers, causing them to become more soluble. Resist in the areas not degraded (the modified region 11) can remain, whereas degraded resist in the standard region 12 can be removed by the developer solution.

Figure 21:
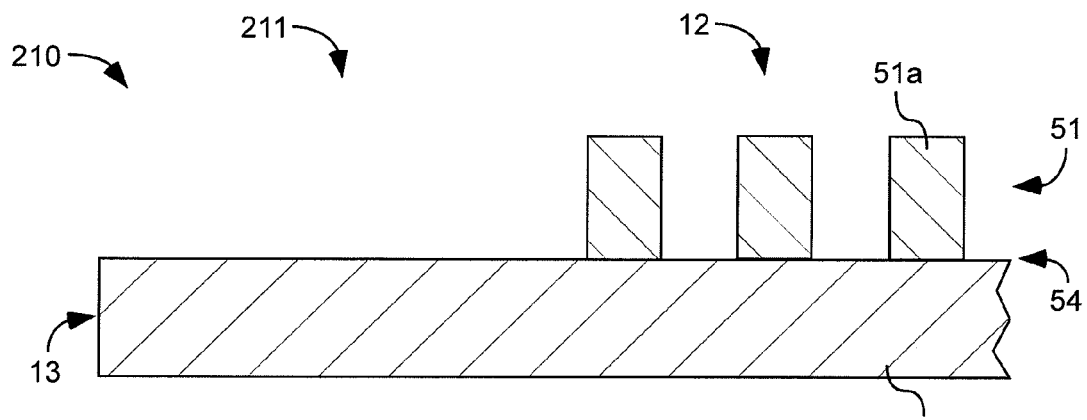
FIG. 21 is a schematic cross-sectional side view of a polarizer, including a standard region 12 and a rib-less region 211, wherein the entire rib structure of ribs has been ablated throughout the rib-less region 211; in accordance with an embodiment of the present invention.

In another embodiment, all or a portion of the ribs can be ablated, such as by using a high power laser. This can result in removal of a portion of the rib, such as is shown in FIGS. 12-14, or in ablation or removal of an entire rib structure, creating a rib-less region 211, such as is shown on polarizer 210 in FIG. 21. The entire rib structure can be ablated throughout the entire rib-less region or throughout at least 75% of the rib-less region.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A polarizer comprising:
a substrate having a first surface bordered by an edge;
an array of parallel, elongated ribs disposed over at least a portion of the first surface of the substrate;
the array of ribs comprising a central standard region and a rib modification region;
the standard region:
covering a central portion of the first surface of the substrate;
including ribs having a standard characteristic; and
configured to polarize incident light; and
the rib modification region:
disposed along at least a segment of the edge of the substrate between the edge and at least a portion of the standard region; and
comprising modified ribs modified from the standard characteristic to have a different characteristic;
a transition region between the rib modification region and the standard region and wherein ribs in the transition region have a transitional characteristic between the rib modification region and the standard region.

2. The polarizer of claim 1, wherein the standard region covers at least 100 times more than the rib modification region of the first surface of the substrate.

3. The polarizer of claim 1, wherein the rib modification region comprises adjacent ribs fused together.

4. A polarizer comprising:
a substrate having a first surface bordered by an edge;
an array of parallel, elongated ribs disposed over at least a portion of the first surface of the substrate;
the array of ribs comprising a central standard region and a rib modification region;
the standard region:
covering a central portion of the first surface of the substrate;
including ribs having a standard characteristic; and
configured to polarize incident light; and
the rib modification region:
disposed along at least a segment of the edge of the substrate between the edge and at least a portion of the standard region; and
comprising modified ribs modified from the standard characteristic to have a different characteristic;
ribs in the rib modification region and ribs in the standard region comprise:
substrate ribs formed in the substrate and extending from the substrate;
metal wires and segmented dielectric ribs disposed over the substrate ribs; and
metal wires in the standard region comprise separate wires such that adjacent wires disposed over adjacent substrate ribs are physically separate one from another.

5. The polarizer of claim 4, wherein:
the different characteristic includes rib width;
metal wires in the rib modification region are at least 25% wider than any rib width of ribs in the standard region; and
wherein rib width is measured in a direction perpendicular to a rib height.

6. The polarizer of claim 4, wherein metal wires in the rib modification region comprise multiple adjacent metal wires fused together.

7. The polarizer of claim 4, wherein a majority of segmented dielectric ribs are substantially aligned with underlying substrate ribs in both the rib modification region and in the standard region.

8. The polarizer of claim 4, wherein:
gaps between ribs in the standard region comprise air and the gaps are substantially free of polymer; and
gaps between ribs in the rib modification region comprise polymer.

9. A polarizer comprising:
a substrate having a first surface bordered by an edge;
an array of parallel, elongated ribs disposed over at least a portion of the first surface of the substrate;
the array of ribs comprising a central standard region and a rib modification region;

the standard region:
  covering a central portion of the first surface of the substrate;
  including ribs having a standard characteristic; and
  configured to polarize incident light; and
the rib modification region:
  disposed along at least a segment of the edge of the substrate between the edge and at least a portion of the standard region; and
  comprising modified ribs modified from the standard characteristic to have a different characteristic;
the standard region having a capillary action caused by channels between the wires; and
a capillary action of the rib modification region is substantially less than the capillary action of the standard region.

10. The polarizer of claim 9, wherein all ribs in the rib modification region are at least 25% shorter than all ribs in the standard region.

11. The polarizer of claim 9, wherein the rib modification region comprises ribs that include an irregular cross-sectional profile and the standard region comprises ribs that have a substantially rectangular cross-sectional profile.

12. The polarizer of claim 9, wherein:
  ribs in the standard region comprise metal wires, dielectric ribs, or combinations thereof, disposed on top of substrate ribs; and
  ribs in the rib modification region comprise substrate ribs having sides and a top that are substantially free other rib material.

13. The polarizer of claim 9, wherein:
  the rib modification region comprises two rib modification regions extending along two different segments of the edge on opposing sides of the polarizer;
  each rib modification region extends along at least 70% of the segment, wherein the segment is a substantially straight portion of the edge between two corners of the edge; and
  the two segments are substantially perpendicular to the array of ribs in the standard region.

14. The polarizer of claim 9, wherein:
  polarization contrast in the rib modification region is less than 10 and polarization contrast in the standard region is greater than 40; and
  contrast is defined as transmission of desired polarization ($T_p$) divided by transmission of undesired polarization ($T_s$).

15. A method of making a polarizer, the method comprising:
  providing a polarizer including an array of parallel, elongated ribs disposed over a substantial portion of a surface of a substrate;
  modifying the ribs along at least a segment of an edge of the substrate forming a modified region having different characteristics than a standard region, such that a capillary action of the modified region is substantially less than a capillary action of the standard region, the capillary action of the standard region being caused by channels between the wires; and
  wherein modifying comprises melting a metallic portion of the ribs, ablating and forming a rib-less region along at least a portion of the edge of the substrate, or combinations thereof.

16. A method of making a polarizer, the method comprising:
  providing a polarizer including an array of parallel, elongated ribs disposed over a substantial portion of a surface of a substrate;
  modifying the ribs along at least a segment of an edge of the substrate forming a modified region having different characteristics than a standard region, such that a capillary action of the modified region is substantially less than a capillary action of the standard region, the capillary action of the standard region being caused by channels between the wires, and wherein modifying the ribs comprises:
  applying a resist over the ribs;
  activating the resist in the modified region or degrading the resist in the standard region; and
  removing the resist from the standard region.

* * * * *